United States Patent [19]

Turnbull

[11] Patent Number: 4,943,108
[45] Date of Patent: Jul. 24, 1990

[54] PICK-UP TRUCK CAP

[76] Inventor: Steven Turnbull, P.O. Box 392, Pleasantville, N.Y. 10570

[21] Appl. No.: 261,846

[22] Filed: Oct. 25, 1988

[51] Int. Cl.⁵ .............................................. B60P 7/02
[52] U.S. Cl. .................................... 296/100; 296/156
[58] Field of Search .......................... 296/100, 156, 10

[56] References Cited
U.S. PATENT DOCUMENTS 2,757,041  7/1956  Alcorn .................................. 296/100
2,909,387 10/1959  Burtzloff ............................. 296/100

FOREIGN PATENT DOCUMENTS 2572342  5/1986  France .................................. 296/100

Primary Examiner—Robert R. Song

[57] ABSTRACT

A cap for a pick-up truck load bed, the bed having a floor and a pair of side walls extending longitudinally on each side of the long axis of the truck, said cap comprising a roof and a pair of side walls depending therefrom and extending longitudinally substantially coextensive therewith, said roof being split centrally longitudinally to provide substantially equal split halves, means for releasably securing the split sections of said roof along the central longitudinal split line and hinge means for pivoting the cap split halves to the side walls of the truck load bed.

2 Claims, 2 Drawing Sheets

PICK-UP TRUCK CAP

FIELD OF THE INVENTION

This invention relates to a cap for covering the load bed of a pick-up truck; the combination of such a cap and load bed which may be converted between an enclosed and open bed and to a method of making a mountable and removable cap to one which converts in place.

BACKGROUND OF THE INVENTION

A usual way to convert an open pick-up truck to a closed one is to mount a cap above the load area and to secure the top of the walls of the load area to the bottom of the walls of the cap. The cap comprises right and left side walls, a roof connecting the sides, a forward end which overlies the forward end of the load area and a rear end which overlies the rear end of the load area. The rear end wall of the cap may be a hinged lift panel and the front and rear ends of the cap may be windowed. The rear end of the load area may be a hinged drop panel.

The removing and mounting of such a cap is arduous and time consuming and involves the cooperation of at least two people as caps are heavy.

There have, therefore, been various alternate constructions providing convertibility to pick-up trucks so that the load bed may be covered for camping or protected hauling, for example, and open for access to the bed or to extend the area above the load bed. Examples of such alternate construction are disclosed in Fletcher U.S. Pat. No. 3,995,890; Hather U.S. Pat. No. 4,284,303; Garvent U.S. Pat. No. 3,858,744; Wilson et al U.S. Pat. No. 4,324,429 and Jensen U.S. Pat. No. 4,629,243.

Jensen teaches the provision of a mountable hinge kit for opening vehicular enclosures and which permits selective access to either side of the truck bed. The kit must be removed, however, to provide an open truck bed.

Wilson et al. attaches a cover to a pick-up bed, which cover is hinged at one of its ends along one end or side of the bed to provide access at the other end of the cover. The cover is also removed for providing an open truck bed.

Garvent provides a pair of cover panels extending longitudinally of the bed of a camper, the panels being hinged at their outer edges to the sides of the bed and openable to vertical and outwardly extending horizontal positions. When closed, the bed is actually not usable, except for hauling gear, as there is no access to the load bed.

Hather discloses a pick-up truck cover and hinge construction in which side cover sections are hinged to the sides of the bed and which permits access to the load bed beneath the cover from either side or from the rear; and, in addition, provides for vertically extending the sides of the load bed by raising the hinged side cover sections.

Fletcher discloses a shell disposed in the load bed with side walls extending from the bed floor to a roof which is longitudinally divided, the divided panels of which are moved by control members from closed horizontal position above the load bed to a vertical position proximate the outer surfaces of the side walls. All of these prior art constructions require custom made cover or shell structures and/or complicated and expensive control members for effecting the conversion.

THE INVENTION

This invention provides the basic structure of a conventional cap with side walls and a roof to overlie the load bed in two separable longitudinally divided halves. The side walls of the cap which give height to the load bed when the cap is closed are hinged at their bottom edges to the top edges of the load bed side walls. The roof sections remain integral with the cap side walls so that the cap halves are separable along a longitudinal central plane with the swinging of the cap halves outwardly on their hinge connections to the load bed side walls.

Thus, the advantage of a load bed enclosed beneath a full sized cap is had with the added advantage that the cap can be swung away from the load bed to accommodate loading and to provide a work platform. In this last connection, it was surprising to note that the heavy half caps swung relatively easily on their hinged connection to the sides of the load bed, the center of gravity apparently being near the hinged connection to begin with.

Similarly, closing the cap by swinging the cap halves on their hinges to the closed position is facilitated by limiting the arcs through which the cap halves swing to the open position to position the weight of the cap halves close to their center of gravity, when in their open position.

In one embodiment of the invention, it may be preferable to include shelving on the side walls of the cap halves which not only accommodates equipment storage and transporting when the cap is closed and equipment availability when open, but also adds to the weight of the cap halves for ease of swinging as the center of gravity moves outwardly to open and inwardly to close.

In a preferred embodiment, limiting the extent of the open position of the split cap is accomplished by connecting limit chains between the top cap halves and the truck bed. Linked bars may, of course, be used, but add to the expense of fabricating and installing the cap or of converting existing caps.

The front and rear end walls of the cap may either be split along the plane of the split in the roof; rendered detachable for removal when the cap is to be opened and reattachable when the cap is closed; or split save for the window area, making the windows removable. The options may be exercised when converting an existing cap into a split cap of the invention or when fabricating the cap ab initio.

BRIEF DESCRIPTION OF THE DRAWINGS

A specific embodiment of the invention will now be described with reference to the drawings in which.

DETAILED DESCRIPTION OF THE INVENTION

Figure 1:
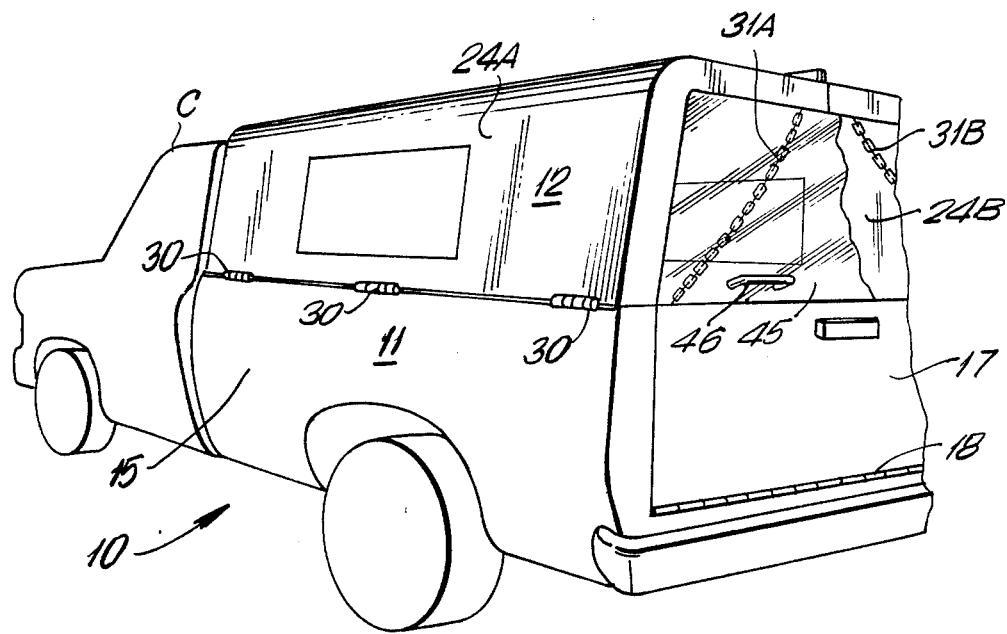
FIG. 1 is a perspective view looking from the rear to the front of a truck having a cap of the invention in the closed position over the load bed.
Figure 2:
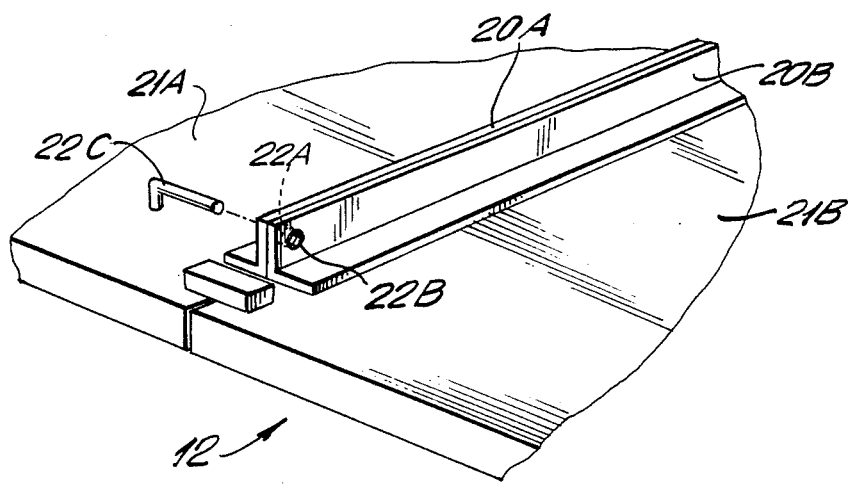
FIG. 2 is a perspective view of the roof of the cap of FIG. 1 showing the rear edges and joinder of the split halves.
Figure 3:
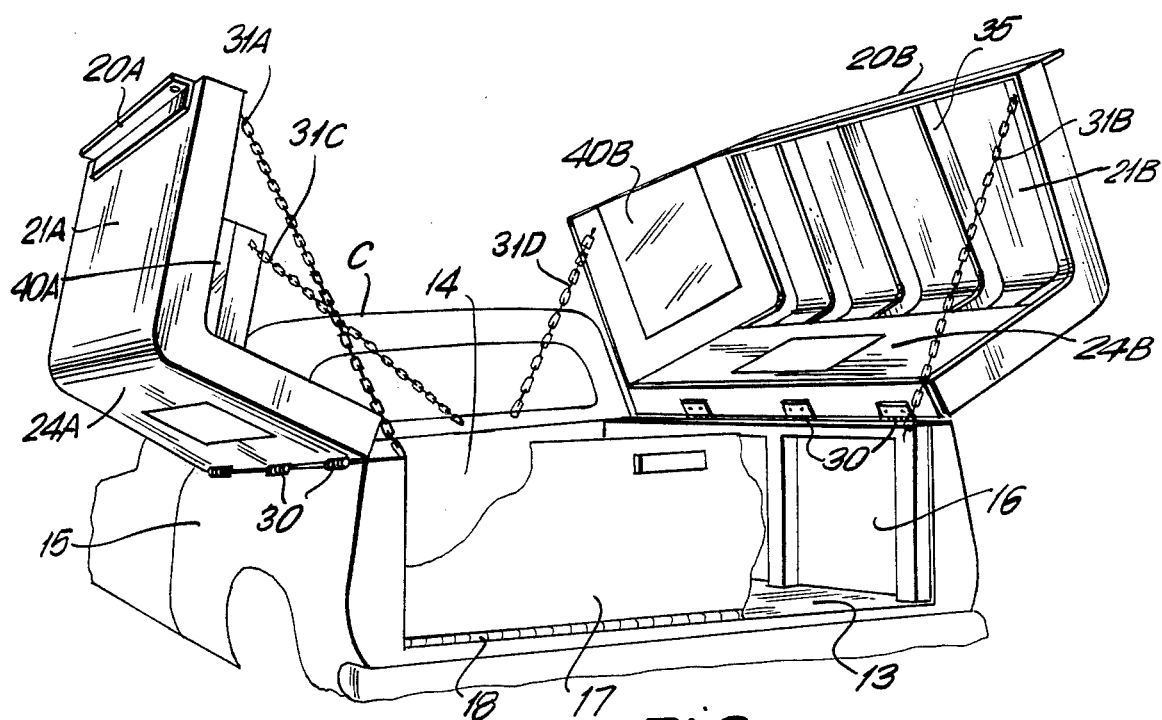
FIG. 3 is a perspective view from the rear of the truck of FIGS. 1 and 2 having the split cap of the invention in the open position.
Figure 4:
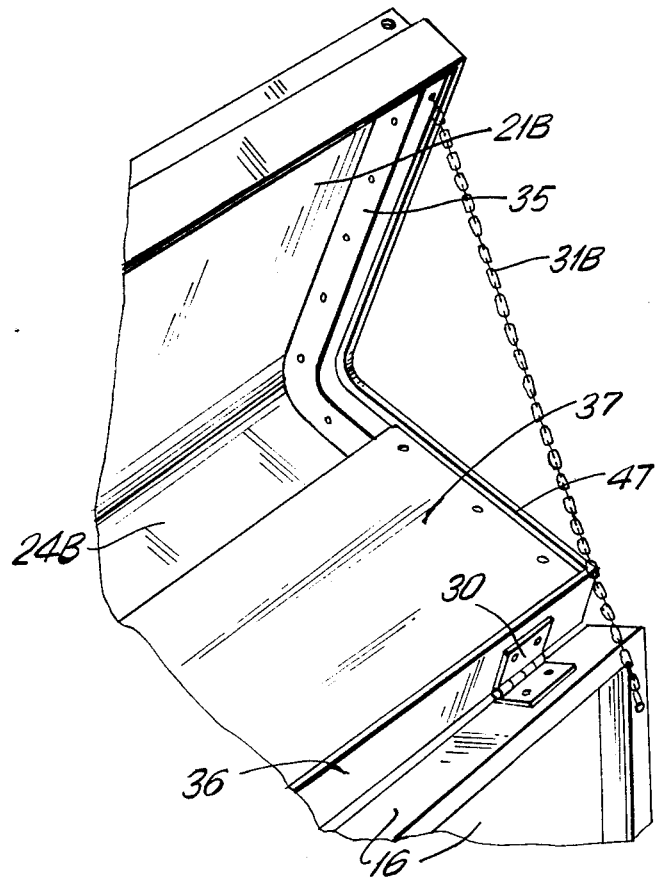
FIG. 4 is a perspective view looking rearwardly from inside the truck with the split cap in the open position and the cap side wall modified to incorporate a shelf guard.

In the drawings, the vehicle 10 is a truck with a load bed 11 covered by a cap 12.

The bed comprises a floor 13, a forward wall 14 and side walls 15 and 16 extending longitudinally on either side of the longitudinal axis of the truck. A rearward wall 17, hinged as at 18 to the rearward end of the floor 13 for drop swinging to an open position completes the usual load bed of the open bed truck.

In the type of truck described, the height of the bed walls is below the top of the cab C and in accordance with the invention, the cap 12, supported on the upper edge of the bed walls is split along a vertical plane extending through the longitudinal axis of the truck where it may be provided with angle bars 20A and 20B, the horizontal legs of which are secured as by welding or otherwise to the upper surfaces of the roof halves 21A, 21B along the inner edges thereof, with their vertical legs juxtaposed to one another and providing mating lock holes 22A, 22B for a lock bar 22C for securing the cap halves in the closed position. Any conventional lock or other securement element may be provided instead of the angle, hole and bar elements disclosed and, of course, weather stripping, not shown, may extend between the roof edges.

Importantly, the lower edges of the cap side walls 24A, 24B, instead of being bolted to the upper edges of the load bed side walls 15, 16 are hinged as at 30 so that the cap halves may be pivoted outwardly to the open position, and in the embodiment disclosed here, limited by limit chains 31A, 31C and 31B, 31D to position the inner edges of the roof approximately in or slightly to the outside of vertical planes common with the side walls.

Note that the "V" shapes of cap halves place the centers of gravity of the halves around vertical planes near the cap wall hinge connections to the bed walls, when in the open and closed position and through their positions therebetween. This is particularly so when the cap structure is provided with struts 35, shown along the walls and roof halves in the drawings. Braced shelving 36, provided with guards 37, and equipment stowed behind them add further to the weight of the cap halves and to the ease of opening and closing them as the center of gravity shifts to and over the hinge connections.

The windowed forward end wall 40A, 40B of the cap is split along the plane in common with the split along the long center line of the roof, while the rear end wall has, in the instance being described, been removed and replaced with a transparent plastic sheet 45 provided with handles 46 for easy removal from and replacement within the side tracks 47 provided along the rearmost edges of the cap walls.

The forward limit chains 31C and 31D are preferably located between the load bed forward wall 14 proximate the center thereof to near the edges of the mating roof halves and stabilize the cap halves in the open position with the roof edges passed the upper edges of the bed walls so that the work area, then provided comprises the whole load bed area accessible from the rear ends of the cap and load bed.

The limit chains 31A and 31B at the rear of the cap/bed are connected between the bed side walls and the split edges of the roof.

Having described a preferred embodiment of the invention, it is understood that the invention is not so limited, but rather is limited only by the breadth and scope of the following claims and as may be broadened by the doctrine of equivalents.

What is claimed is:

1. A cap for mounting on the load bed of a pick-up truck, the bed having a floor, a pair of laterally extending end walls and a pair of side walls extending longitudinally on each side of the long axis of the truck, said cap comprising a roof, a pair of walls depending therefrom and extending longitudinally substantially coextensive therewith and at least one end panel extending, when said cap is mounted on the load bed, substantially coextensive with the end walls of the load bed, said roof and said cap side walls extending, when said cap is mounted on the load bed, substantially coextensive with the floor and side walls respectively of the load bed, said roof being split centrally longitudinally to provide substantially equal split cap halves, means for releasably securing said split cap halves along the central longitudinal split line, hinge means for pivotally mounting the split cap halves to the side walls of the truck load bed the arrangement, including the weight distribution in said split cap halves and the length, width and height thereof, being such that said split cap halves are manually, freely pivotable away from the longitudinal split line to an open position and means are provided for limiting the extent said cap split halves may be pivoted away from the longitudinal split line, whereby the floor of said road bed constitutes a work area when said cap split halves are opened, access means for entering and exiting said work area at an end of said cap and of said load bed.

2. The cap of claim 1, wherein at least one of said side walls includes shelf means along an inner surface thereof for storage and with its respective said split cap half constitute means for distributing the weight of said at least one side wall to position the center of gravity near said hinge means when in the open or closed positions.

* * * * *